Oct. 15, 1929.  F. R. PETERS  1,731,437
RAILWAY BOOSTER
Filed June 4, 1924   2 Sheets-Sheet 2
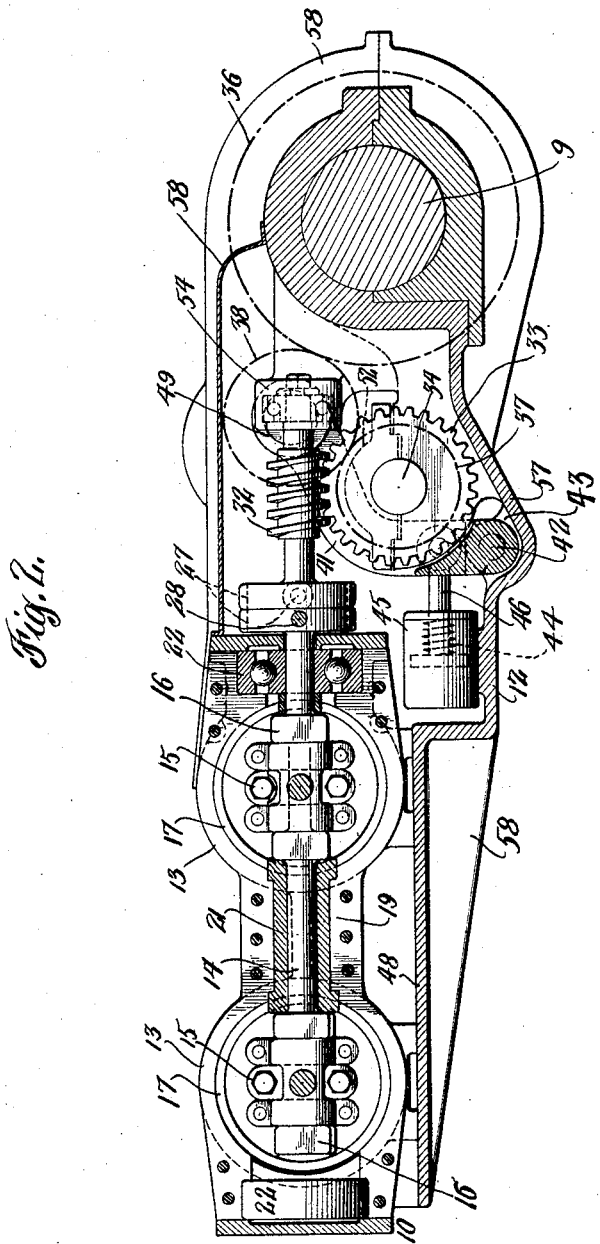

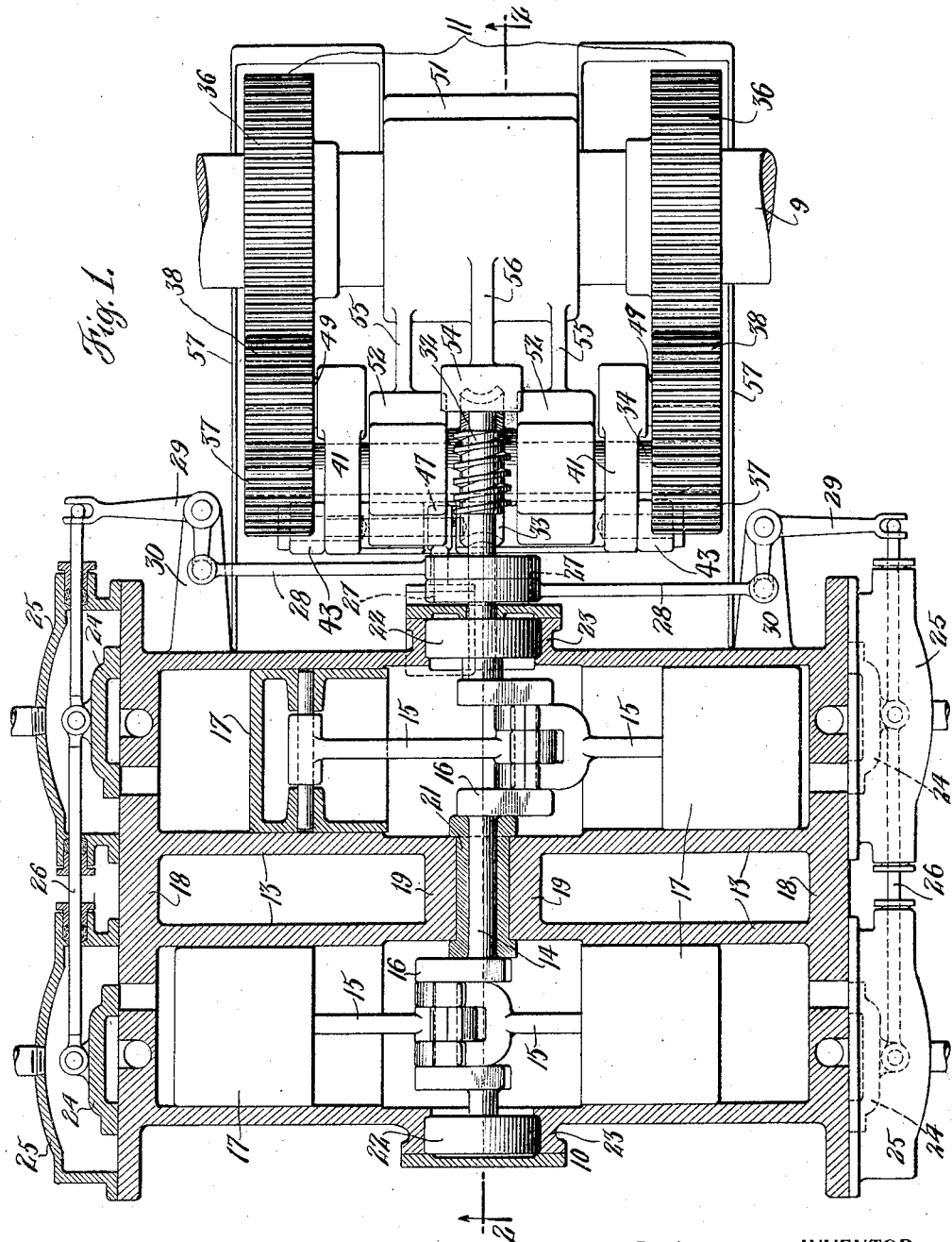

Patented Oct. 15, 1929

1,731,437

UNITED STATES PATENT OFFICE

FRANK RICHARD PETERS, OF NEW YORK, N. Y., ASSIGNOR TO FRANKLIN RAILWAY SUPPLY COMPANY, A CORPORATION OF DELAWARE

RAILWAY BOOSTER

Application filed June 4, 1924. Serial No. 717,715.

My invention relates to railway boosters, such as are used on railway vehicles to assist in their propulsion, and especially on the trailer trucks of locomotives. In general, such a booster serves to increase the tractive power in starting and at slow speeds, by making drivers of wheels which would otherwise merely help to sustain the deadweight. However, the booster is not ordinarily intended to drive the locomotive or the train by itself, or to operate at all at high speeds, and provisions are accordingly made for automatically disconnecting it when the steam supply to the locomotive is shut off, or when the speed exceeds a predetermined limit—as well, of course, as for enabling the engineer to connect and disconnect it at will under proper conditions.

The space available for a booster on a railway truck is necessarily very limited. Accordingly, notwithstanding every effort to build the booster just as short as possible fore and aft of the locomotive, and as narrow as possible transversely, the smallest dimensions heretofore consistent with realizing the desired booster power often encroach on space much needed for other locomotive parts or equipment; thus entailing disadvantageous locations for such parts (if not their omission altogether), or else preventing any application of boosters to locomotives of certain designs. Compactness and lightness of the booster are also advantageous and desirable for various other reasons.

I aim to obviate such drawbacks, by providing a novel type and construction of booster, that can be made more compact and lighter than heretofore, and better adapted to the location in which it is mounted. In the particular embodiment of my invention here shown and described, I accomplish these objects partly by the employment of a compact type of high speed engine, and partly by a novel organization of the booster, especially as regards the arrangement of the engine and its driving connections to the vehicle axle.

In the drawings, Fig. 1 is a plan view of the booster mechanism with the upper half of its casing removed, and the engine cylinders and other parts in horizontal mid-section.

Fig. 2 shows a vertical fore and aft section through the booster, taken about as indicated by the line 2—2 in Fig. 1.

In the drawings, the booster is shown mounted about the axle 9 which it is intended to drive; it may, of course, be additionally supported as usual, or in any suitable manner. It comprises a multiple cylinder engine 10, with reduction gearing 11 of high ratio for connecting it to the axle 9, and a frame structure 12 to which various parts are attached. Owing to the high speed of the engine 10 permitted by the high ratio of the gearing 11, the engine can be made smaller and more compact than in boosters heretofore built, notwithstanding the number of cylinders, and even though of single-acting type, as here shown. In particular, the overall length of the booster,—i. e., its extension to the left from the axle 9 in Figs. 1 and 2,—can be made smaller, and the height of the engine 10 can be made less. As here shown, also, the narrower portion of the booster, at the gearing 11, represents a greater proportion of the overall length than in boosters heretofore used.

These proportions conform to the space available for the booster on locomotive, tender, and other railway vehicle trucks, and obviate all interference of the booster with application of brakes to the wheels (not shown) of the axle 9. In prior types of booster, such proportions have been impossible, owing to the size of the cylinders and the proximity of the engine cranks to the axle 9.

In the present instance, the engine cylinders 13 (of which four are shown) extend transversely of the vehicle (not shown) to which the axle 9 belongs, and are arranged in pairs at opposite sides of a common fore and aft crank shaft 14. Each pair of opposed cylinders in effect forms one cylindrical chamber, whose mid-portion serves as crank case for the pitmen 15 and their common crank 16 through which the single-acting trunk pistons 17 drive the shaft 14. In the present instance, adjacent cylinders 13 are in one casting, being interconnected by webs 18, 19 at their head and crank ends; and the cylinder structure as a whole comprises two such castings with flanged ends abutting and bolted together along the crank shaft 14. Besides a sleeve bearing 21 in the two-part "hub" connection 19, 19 between the cylinders 13, the crank shaft 14 has ball-bearings 22, 22 in somewhat similar hubs 23, 23 at either side of the cylinder structure. The valve gearing of the engine is actuated by connection to the crank shaft 14 between the gearing 11 and the adjacent cylinders 13. Each of the cylinders 13 is provided with a D slide valve 24 in the chest 25 on its head, and corresponding valves 24, 24 are pivotally attached to a common valve rod or stem 26. In the present instance, the valve chests 25 for adjacent cylinders 13 are separate, and the valve rod 26 extends through stuffing boxes at their adjacent sides. Each of the valve pairs 24, 24 is actuated by an eccentric 27 on the shaft 14, adjacent the corresponding bearing hub 23, through an eccentric strap and rod 28 and a rocker 29. As shown, the valve rod 26 has a pin and slot connection to one arm of the rocker 29, and the eccentric rod 28 has a ball and socket connection to its other arm. Each rocker 29 is fulcrumed on a bracket 30 projecting from the adjacent cylinder 13.

The gearing 11 here shown involves a multiple reduction: first, by a worm 32 on the crank shaft 14 and a cooperating worm wheel 33 on a transverse counter shaft 34, that parallels the axle 9; and then by spur gears between counter shaft and axle. Preferably, two parallel trains or sets of spur gearing are employed, one at either side of the worm gearing 32, 33. As shown, each spur gear train comprises a gear 36 on the axle 9, a pinion 37 on one end of the counter shaft 34, and, preferably, an interposed idler pinion 38. Such an arrangement of the gearing 11 minimizes the space required (especially fore and aft) for effecting the transmission from the fore and aft engine shaft 14 to the transverse axle 9 and the necessary reduction in speed; while the employment of a multiple reduction (in this instance double) obviates excessive size of the gear 36, for example. The duplication of the spur gear trains 37, 38, 36 at opposite sides of the booster not only gives a smoother, easier action generally, but also minimizes the tendency to turn, twist, or "capsize" the booster (so to speak) about a fore and aft axis more or less nearly corresponding to the shaft 14.

As here shown, each idler pinion 38 is mounted on an arm of a U-shaped double rocker 41 fulcrumed on pivot pins 42 mounted in lugs 43 on the bed plate 12,—below and a little to the left of the counter shaft 34. The idler pinion 38 is always in mesh with the counter shaft pinion 37 at their pitch lines, and is swung out of and into mesh with the axle gear 36 by a spring 44 and an operating motor 45, preferably of fluid piston type. The cylinder of this motor 45 is mounted on the lower portion of the bed plate 12, beneath the adjacent bearing hub 23 of the cylinder structure, and its piston rod 46 has a suitably loose connection to a lug or arm 47 on the rocker 41. In the present instance, the main arms of the rocker 41 are of bent form, to extend around the counter shaft 34 from the rocker pivots 42 to the idler pinion pivot studs 49. This allows the axes of the pivot 42, counter shaft pinion 37 and idler pinion 38 to be in a straight line when the idler pinion is in mesh with the axle gear 36; so that in swinging into and out of mesh with the gear 36, the idler pinion 38 does not vary materially from the pitch line of the counter shaft pinion 37. As a whole, this mode of entraining and disentraining (or "clutching and unclutching") the booster resembles that commonly employed in existing boosters, so that detailed description of its operation is unnecessary.

As most clearly shown in Fig. 2, the cylinders 13 are mounted on a relatively high horizontal bed plate portion 48 of the frame structure 12 already mentioned. This structure 12 also carries two-part bearings 51, 52, 52 for the axle 9 and the counter shaft 34, as well as a ball bearing at 54 for the end of the crank shaft 14 adjacent the axle 9. As shown, (Figs. 1 and 2) these bearings 51, 52, 54 are attached to vertical fore and aft webs 55, 56 upstanding from the corresponding more or less horizontal plate portion 57 of the frame 12. With correspondingly located webs 58 on the lower side of the frame portion 48 where the cylinders 13 are mounted, the webs 55 form the principal vertical fore and aft strength members of the booster frame 12. The outer edges of the bed plate 57 extend up around the gearing 11 for the purpose of enclosing it, as well as to form a reservoir about the gears 33, 36, 37 for an oil bath (up to about the level of the bed plate 48) for splash lubrication of the gearing, of various bearings, and of the eccentrics 27, etc. By this conformation of the bed plate portion 57 in conjunction with a removable sheet metal cover 58', a casing is provided for completely enclosing the gearing 11, eccentrics 27, motor 45, etc. In the present instance, the engine 10 as a whole is excluded from this casing, inasmuch as its moving parts are sufficiently enclosed in its own cylinder and valve chest structure. Accordingly, the eccentric rods 28 extend out through openings in the casing sides to actuate the rockers 29.

I claim:

1. The combination with a railway vehicle axle, of a booster comprising opposed cylinders and pistons, a common crank shaft between them extending fore and aft of the vehicle, a countershaft reductively geared to said crank shaft, and reduction gearing between countershaft and axle shiftable into and out of mesh to connect and disconnect them.

2. The combination with a railway vehicle axle, of a booster comprising opposed cylinders and pistons, a common crank shaft between them extending fore and aft of the vehicle, a transverse countershaft helically geared to said crank shaft, and spur gearing between countershaft and axle shiftable into and out of mesh to connect and disconnect them.

3. The combination with a railway vehicle axle, of a booster comprising opposed cylinders and pistons, a common crank shaft between them extending fore and aft of the vehicle, and a transverse countershaft beneath said crank shaft helically geared thereto and reductively geared to said axle.

4. A railway booster comprising opposed cylinders and pistons with a common fore and aft crankshaft between them, and gearing at either side of said crankshaft for connecting it to the axle.

5. A railway booster comprising opposed cylinders and pistons with a common fore and aft crankshaft between them, a transverse countershaft helically geared to said crankshaft, and disentrainable spur gearing at either side of said helical gearing for connecting said countershaft to said axle.

6. A railway booster comprising a frame structure with bearing for a vehicle axle, a transverse shaft driven by the booster motor arranged to parallel the axle in said bearing, and dual shiftable gearing for connecting said transverse shaft to said axle at both sides of said bearing.

7. A railway booster comprising a transverse countershaft arranged to parallel the vehicle axle to be driven by the booster, a frame structure with bearings for countershaft and axle, opposed cylinders and pistons with a common fore and aft crankshaft between them geared to said countershaft between its said bearings, and gearing for connecting said countershaft to said axle at either side of the aforesaid countershaft and axle bearings.

8. A railway booster comprising a bed and frame structure with bearing for a vehicle axle, opposed cylinders on said bed with a common fore and aft crankshaft between them, and gearing for connecting said crankshaft to said axle.

9. A railway booster comprising opposed cylinders and pistons with a common fore and aft crankshaft between them, gearing for connecting said crankshaft to a vehicle axle transverse thereto, and valve gear for said cylinders with actuating connections to said crankshaft between cylinders and gearing.

10. A railway booster comprising opposed cylinders and pistons with a common fore and aft crankshaft between them, a frame structure attached to said cylinders and affording bearing for a vehicle axle shaft transverse to said crankshaft, a transverse countershaft with gearing for connecting it to crankshaft and axle, and valve gear for said cylinders with actuating connections to said crankshaft between the cylinders and said transverse shafts.

In testimony whereof I have hereunto signed my name.

FRANK RICHARD PETERS.